United States Patent
Seo (10) Patent No.: US 10,781,711 B2
(45) Date of Patent: Sep. 22, 2020

(54) ROTOR DISC SEALING DEVICE, AND ROTOR ASSEMBLY AND GAS TURBINE INCLUDING THE SAME

(71) Applicant: DOOSAN HEAVY INDUSTRIES & CONSTRUCTION CO., LTD., Changwon-si, Gyeongsangnam-do (KR)

(72) Inventor: Ja Won Seo, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 263 days.

(21) Appl. No.: 15/899,823

(22) Filed: Feb. 20, 2018

(65) Prior Publication Data
US 2018/0291758 A1  Oct. 11, 2018

(30) Foreign Application Priority Data
Apr. 11, 2017  (KR) .................. 10-2017-0046876

(51) Int. Cl.
| F01D 11/00 | (2006.01) |
| F01D 5/06 | (2006.01) |
| F01D 5/08 | (2006.01) |
| F01D 5/30 | (2006.01) |
| F01D 5/32 | (2006.01) |
| F02C 3/04 | (2006.01) |

(52) U.S. Cl.
CPC ............ *F01D 11/005* (2013.01); *F01D 5/066* (2013.01); *F01D 5/081* (2013.01); *F01D 5/087* (2013.01); *F01D 5/3015* (2013.01); *F01D 5/326* (2013.01); *F01D 11/003* (2013.01); *F02C 3/04* (2013.01); *F05D 2220/30* (2013.01); *F05D 2220/32* (2013.01); *F05D 2240/20* (2013.01); *F05D 2240/30* (2013.01); *F05D 2240/55* (2013.01); *F05D 2250/711* (2013.01); *F05D 2260/30* (2013.01)

(58) Field of Classification Search
CPC ...... F01D 11/005; F01D 5/326; F01D 5/3015; F01D 5/081; F01D 5/066; F01D 11/003; F01D 5/087; F01D 5/06; F05D 2260/30
See application file for complete search history.

(56) References Cited

U.S. PATENT DOCUMENTS

| 2,458,149 A * | 1/1949 | Cronstedt | F01D 5/06 416/201 R |
| 2,461,242 A * | 2/1949 | Soderberg | F01D 5/06 416/201 R |
| 3,356,339 A * | 12/1967 | Thomas | F01D 5/066 416/244 R |
| 4,470,756 A * | 9/1984 | Rigo | F01D 5/3015 416/219 R |

(Continued)

FOREIGN PATENT DOCUMENTS

| JP | 3643692 B2 | 4/2005 |
| KR | 10-2016-0032609 A | 3/2016 |

*Primary Examiner* — Eldon T Brockman
(74) *Attorney, Agent, or Firm* — Invenstone Patent, LLC (57) ABSTRACT

A rotor disc sealing device, which seals a leakage gap generated in a space between facing surfaces of rotor discs to be coupled to one another, can include: slots formed in the facing surfaces of the rotor discs; a sealing plate formed of a hard material and inserted into the slots; and an auxiliary plate formed of a soft material and coupled to one side of the sealing plate.

20 Claims, 4 Drawing Sheets

(56) References Cited

U.S. PATENT DOCUMENTS

| | | | | |
|---|---|---|---|---|
| 5,267,397 | A * | 12/1993 | Wilcox | B63H 21/16 29/889.1 |
| 5,628,621 | A * | 5/1997 | Toborg | F01D 5/066 416/198 A |
| 6,315,301 | B1 * | 11/2001 | Umemura | F01D 11/005 277/545 |
| 6,431,825 | B1 * | 8/2002 | McLean | F01D 11/005 277/644 |
| 6,733,234 | B2 * | 5/2004 | Paprotna | F01D 11/005 277/637 |
| 6,926,284 | B2 * | 8/2005 | Hirst | F01D 11/005 277/603 |
| 7,309,210 | B2 * | 12/2007 | Suciu | F01D 5/066 415/174.2 |
| 7,360,769 | B2 * | 4/2008 | Bennett | F01D 11/005 277/641 |
| 8,322,977 | B2 * | 12/2012 | Beeck | F01D 11/005 415/139 |
| 9,909,437 | B2 * | 3/2018 | Hubley | F01D 11/003 |
| 9,951,687 | B2 * | 4/2018 | Lee | F02C 3/04 |
| 2004/0052637 | A1 * | 3/2004 | Paprotna | F01D 11/005 415/170.1 |
| 2006/0130456 | A1 * | 6/2006 | Suciu | F01D 5/066 60/226.1 |
| 2011/0020113 | A1 * | 1/2011 | Beeck | F01D 25/246 415/174.2 |
| 2016/0146101 | A1 * | 5/2016 | Lee | F02C 3/04 415/68 |

* cited by examiner

ROTOR DISC SEALING DEVICE, AND ROTOR ASSEMBLY AND GAS TURBINE INCLUDING THE SAME

CROSS-REFERENCE TO RELATED PATENT APPLICATION

This application claims the benefit of Korean Patent Application No. 10-2017-0046876, filed Apr. 11, 2017, the disclosure of which is hereby incorporated by reference in its entirety.

BACKGROUND OF THE INVENTION

1. Field of the Invention

The present invention relates to a rotor disc sealing device that seals a combined part of adjacent rotor discs in a rotor assembly for a gas turbine, and a rotor assembly and a gas turbine including the same.

2. Description of the Related Art

Examples of a turbine that is a machine device that attains a rotational force with an impulsive force or a reaction force using the flow of a compressive fluid, such as steam or gas, include a steam turbine using steam and a gas turbine using high-temperature combustion gas.

Among them, the gas turbine largely includes a compressor, a combustor, and a turbine. The compressor includes an air introduction port through which air is introduced, and a plurality of compressor vanes and a plurality of compressor blades, which are alternately disposed within a compressor casing.

The combustor supplies fuel to the air compressed by the compressor, ignites the fuel by using a burner so that high-temperature and high-pressure combustion gas can be generated.

In the turbine, a plurality of turbine vanes and a plurality of turbine blades are alternately disposed within a turbine casing. Also, a rotor is disposed to pass through the compressor, the combustor, the turbine, and the center of an exhaust chamber.

The rotor is configured in such a way that both ends thereof are rotatably supported by a bearing. A plurality of discs are fixed to the rotor so that the blades are connected to the plurality of discs, respectively, and simultaneously a driving shaft, such as a power generator, is connected to an end of a side of the exhaust chamber.

Because such a gas turbine does not include a reciprocating motion machine, such as a piston for a four-stroke engine, there is no mutual frictional part, such as a piston-cylinder, consumption of a lubricating oil is very low, amplitude that is the feature of the reciprocating motion machine is greatly reduced, and high-speed motion is possible.

In a brief description of the operation of the gas turbine, air compressed by the compressor is mixed with fuel and is combusted so that high-temperature combustion gas is generated, and the generated combustion gas is injected into a turbine. While the injected combustion gas passes through the turbine vanes and the turbine blades, rotational force is generated, and thus, the rotor rotates.

In this case, the respective discs are coupled to one another so as to rotate together with adjacent discs in such a way that rotational torque can be transferred between the adjacent discs using a coupling method such as Curvic or Hirth coupling, whereby tooth forms are engaged with each other in a state in which the tooth forms are formed in facing surfaces of facing discs in a circumferential direction.

However, in a rotor assembly according to the related art, when the facing surfaces of the facing discs are coupled to each other so that the tooth forms thereof are engaged with each other, a leakage gap may be formed between the tooth forms of the coupled discs, in more detail, in a point where hill and valley parts of the tooth forms meet each other, and gas may leak through the leakage gap.

Technology regarding the rotor assembly according to the related art is disclosed in Korean Patent Laid-open Publication No. 10-2016-0032609 (published on Mar. 24, 2016).

SUMMARY OF THE INVENTION

The present invention provides a rotor disc sealing device that seals a leakage gap between facing surfaces of discs to be coupled to each other to inhibit gas leak through the leakage gap, and a rotor assembly and a gas turbine including the same.

According to an aspect of the present invention, there is provided a rotor disc sealing device, which seals a leakage gap generated in a space between facing surfaces of rotor discs to be coupled to one another, including: slots formed in the facing surfaces of the rotor discs; a sealing plate inserted into the slots; and an auxiliary plate coupled to one side of the sealing plate, wherein a material of the auxiliary plate is softer than that of the sealing plate.

According to another aspect of the present invention, there is provided a rotor assembly including: a compressor section including a plurality of compressor rotor discs; a turbine section including a plurality of turbine rotor discs; a tie rod that passes through the compressor section and the turbine section and extends; a fastening portion coupled to both ends of the tie rod and configured to fasten the compressor section and the turbine section to the tie rod; a torque tube disposed between the compressor section and the turbine section so as to forcibly connect the compressor section and the turbine section; and a sealing portion installed in a space between facing surfaces of the plurality of compressor rotor discs to be coupled to one another and a space between facing surfaces of the plurality of turbine rotor discs, and configured to seal the space between the facing surfaces of the plurality of compressor rotor discs to be coupled to one another and the space between the facing surfaces of the plurality of turbine rotor discs.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Hereinafter, exemplary embodiments of the present invention will be described with reference to the attached drawings.

Figure 1:
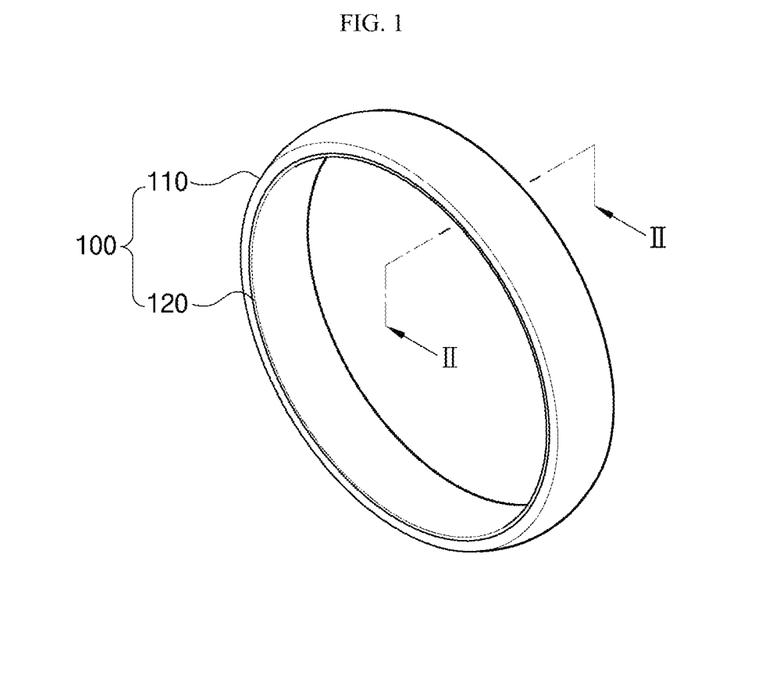
FIG. 1 is a perspective view of a rotor disc sealing device according to an embodiment of the present invention.
Figure 2:
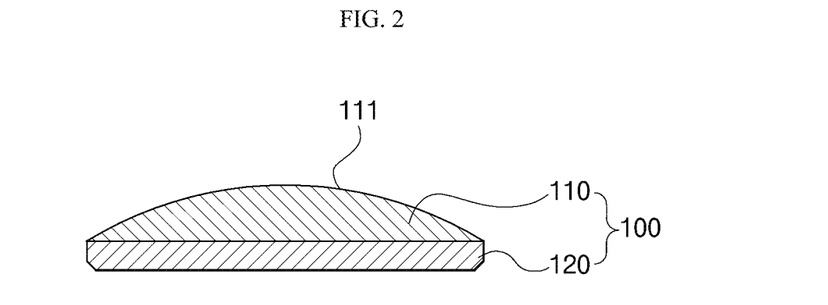
FIG. 2 is a cross-sectional view taken along a line II-II of FIG. 1.
Figure 6:
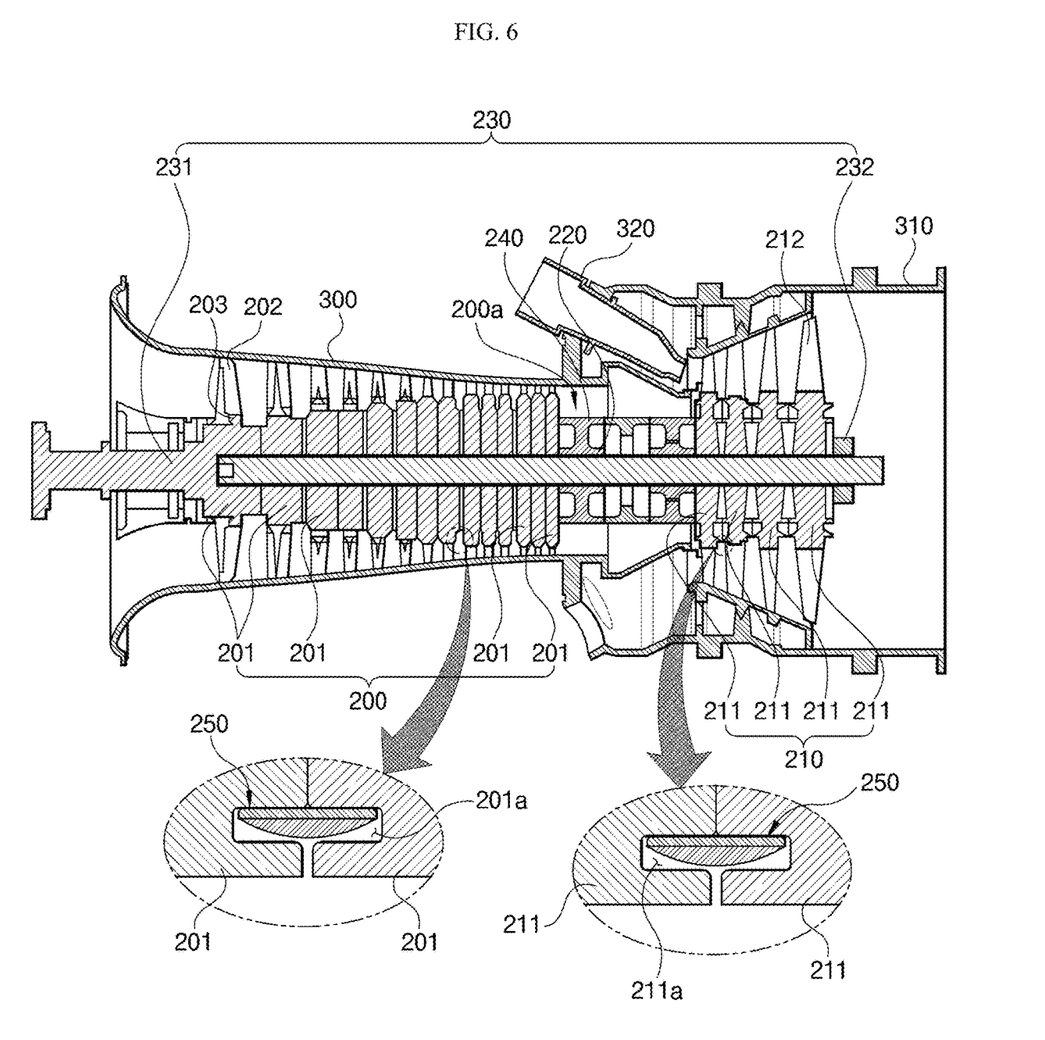
FIG. 6 is a cross-sectional view of a configuration of a gas turbine to which a rotor assembly according to an embodiment of the present invention is applied.

FIG. 1 is a perspective view of a rotor disc sealing device according to an embodiment of the present invention, and FIG. 2 is a cross-sectional view taken along a line II-II of FIG. 1. Referring to FIGS. 1 and 2, a rotor disc sealing device 100 according to an embodiment of the present invention includes a sealing plate 110 and an auxiliary plate 120. The rotor disc sealing device 100 according to an embodiment is installed in a space between facing surfaces of a plurality of compressor rotor discs 201 and a space between facing surfaces of a plurality of turbine rotor discs 211, respectively, which will be coupled to each other while being in contact with each other, as illustrated in FIG. 6. In more detail, the rotor disc sealing device 100 is disposed in slots 201a and 211a formed to correspond to each other in the facing surfaces of the plurality of compressor rotor discs 201 and the facing surfaces of the plurality of turbine rotor discs 211, respectively, thereby sealing the space between the facing surfaces of the plurality of compressor rotor discs 201 and the space between the facing surfaces of the plurality of turbine rotor discs 211 that are coupled to one another in contact with one another. The slots 201a and 211a are formed in the compressor rotor discs 210 and the turbine rotor discs 211, respectively, to have ring shapes in a circumferential direction. In this case, the facing surfaces of the plurality of compressor rotor discs 201 and the facing surfaces of the plurality of turbine rotor discs 211 that are coupled to one another in contact with one another, have an engaging tooth form structure.

The sealing plate 110 is a plate member having a ring structure so as to seal a leakage gap between the facing surfaces of the plurality of compressor rotor discs 201 that are coupled to one another in contact with one another due to a centrifugal force when the compressor rotor discs 201 rotate. Similarly, the sealing plate 110 has a plate member of a ring structure that seals a leakage gap between the facing surfaces of the plurality of turbine rotor discs 211 that are coupled to one another in contact with one another due to the centrifugal force when the turbine rotor discs 211 rotate. The sealing plate 110 is inserted into the slots 201a and 211a.

The sealing plate 110 may be formed of hard metal or synthetic resin so as to maintain a stable sealed state and durability when sealing the leakage gap between the facing surfaces of the plurality of compressor rotor discs 201 and the facing surfaces of the plurality of turbine rotor discs 211 that are coupled to one another in contact with one another due to the centrifugal force.

Also, one side of the sealing plate 110 is coupled to the auxiliary plate 120 that will be described later, and a round portion 111 is convexly formed on the other side of the sealing plate 110, i.e., on a surface that closely contacts the compressor rotor discs 201 and the turbine rotor discs 211 so as to seal the leakage gap between the facing surfaces of the plurality of compressor rotor discs 201 and the facing surfaces of the plurality of turbine rotor discs 211 that are coupled to one another in contact with one another due to the centrifugal force. That is, the round portion 111 stably seals the leakage gap between the facing surfaces of the plurality of compressor rotor discs 201 and the leakage gap between the facing surfaces of the plurality of turbine rotor discs 211 while making the other side of the sealing plate 110 inserted into the slots 210a and 211a be stably in close contact with each of the compressor rotor discs 201 and the turbine rotor discs 211.

The auxiliary plate 120 is a plate member having a ring structure coupled to one side of the sealing plate 110. The auxiliary plate 120 supports the sealing plate 110 and simultaneously absorbs vibration in a state in which the sealing plate 110 seals the leakage gap due to the centrifugal force, and subsequently, when no centrifugal force is generated due to stop of rotation of the compressor rotor discs 201 and the turbine rotor discs 211, the auxiliary plate 120 inhibits damage caused by collision of the sealing plate 110. The auxiliary plate 120 may be formed of soft synthetic resin or rubber so as to support the sealing plate 110 and absorb vibration or an impulsive force. The auxiliary plate 120 is softer than the sealing plate 110.

Figure 3:
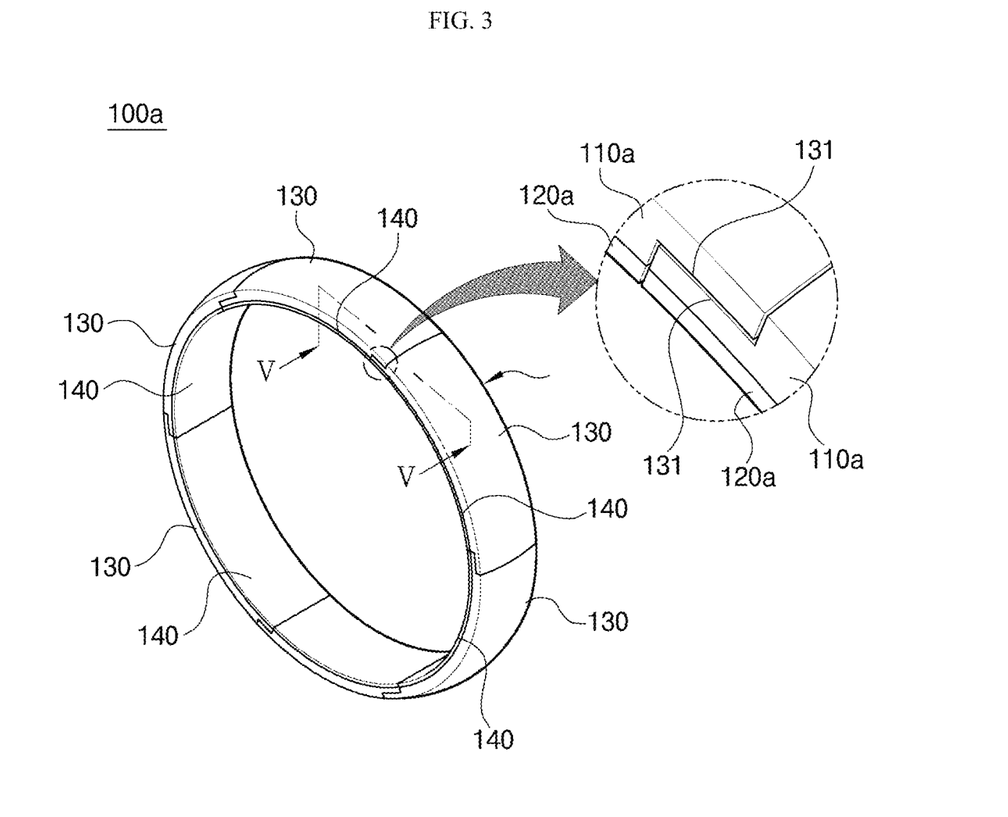
FIG. 3 is a perspective view of a rotor disc sealing device according to another embodiment of the present invention.

FIG. 3 is a perspective view of a rotor disc sealing device 100a according to another embodiment of the present invention. Referring to FIG. 3, the rotor disc sealing device 100a according to another embodiment of the present invention includes a sealing plate 110a and an auxiliary plate 120a. Each of the sealing plate 110a and an auxiliary plate 120a may be configured to include a plurality of unit plate members 130 and 140 and to have a ring structure by connecting both longitudinal ends of the plurality of unit plate members 130 and 140. In this way, when each of the sealing plate 110a and the auxiliary plate 120a includes the plurality of unit plate members 130 and 140, if a centrifugal force is generated in a state in which the rotor disc sealing device 100a is inserted into the slots 201a and 211a, mobility is increased when the centrifugal force is applied to the respective unit plat members 130 and 140, so that the sealing efficiency of the leakage gap between facing surfaces of a plurality of compressor rotor discs 201 and the leakage gap between facing surfaces of a plurality of turbine rotor discs 211 can be improved.

Figure 4:
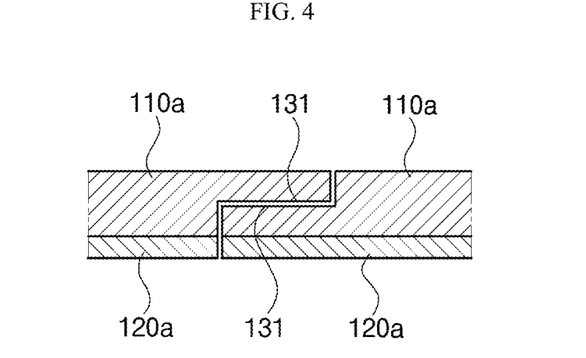
FIG. 4 is a cross-sectional view taken along a line V-V of FIG. 3.
Figure 5:
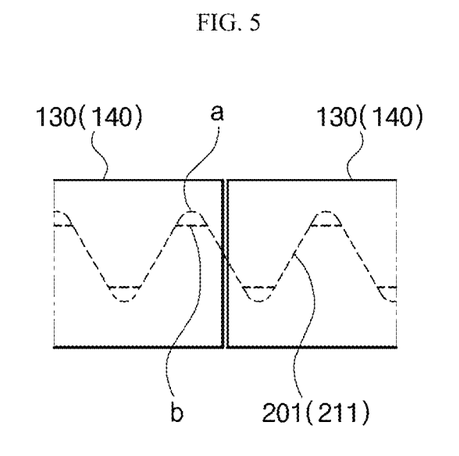
FIG. 5 is a schematic view showing an installation state of the rotor disc sealing device illustrated in FIG. 3.

Referring to FIGS. 3-5, when each of the sealing plate 110a and the auxiliary plate 120a includes the plurality of unit plate members 130 and 140, respectively, both connecting ends of the unit plate members 130 and 140 are placed between hill 'a' and valley 'b' parts of tooth forms through which facing surfaces of the plurality of compressor rotor discs 201 are coupled to one another, and between hill 'a' and valley 'b' parts of tooth forms through which facing surfaces of the plurality of turbine rotor discs 211 are coupled to one another. As a result, a stable sealing state of a leakage gap that is generated in a crossing point of the hill 'a' and valley 'b' parts of the tooth forms can be maintained.

Referring to FIG. 4, the unit plate members 130 of the sealing plate 110a forms stepped portions 131 that correspond to both longitudinal connecting ends thereof. Thus, a contact area with both longitudinal ends of the plurality of unit plate members 130 can be increased, and a stable connection state can be maintained.

FIG. 6 is a cross-sectional view of a configuration of a gas turbine to which a rotor assembly according to an embodiment of the present invention is applied. Referring to FIG. 6, a rotor assembly 200a according to an embodiment of the present invention includes a compressor section 200, a turbine section 210, a tie rod 220, a fastening portion 230, a torque tube 240, and a sealing portion 250. The rotor assembly 200a may be selectively adopted in a gas turbine. The gas turbine includes a housing 300, and a diffuser 310, which is disposed at a rear side of the housing 300 and through which combustion gas that passes through the gas turbine is discharged. A combustor 320 is disposed in the gas turbine and combusts air compressed in the forward direction of the diffuser 310. The gas turbine will now be described based on the flow direction of air. The compressor section 200 is placed at an upstream side of the housing 300, and the turbine section 210 is disposed at a downstream side of the housing 300. The torque tube 240 that is a torque transfer member for transferring rotational torque generated in the turbine section 210 to the compressor section 200 is disposed between the compressor section 200 and the turbine section 210.

The compressor section 200 is a portion for compressing air to be supplied to the combustor 320 of the gas turbine. The compressor section 200 includes a plurality of compressor rotor discs 201 to be coupled to one another, and facing surfaces of the plurality of compressor rotor discs 201 have a Curvic or Hirth structure so that they are coupled to one another through corresponding tooth forms. In this case, a plurality of compressor blades 202 are radially installed on an outer circumferential surface of each of the compressor rotor discs 201, and the compressor rotor discs 201 are inserted into an outside of the tie rod 220 that will be described later. In this case, each of the compressor blades 202 includes a root portion 203 and is fastened to each compressor rotor disc 201. A vane (not shown) is disposed between the compressor rotor discs 201 and is fixed to the housing 300. Unlike each compressor rotor disc 201, the vane is fixed not to rotate, aligns the flow of compressed air that passes through each compressor blade 202 of each compressor rotor disc 201, and guides air to the compressor blade 202 of the compressor rotor disc 201 placed at the downstream side of the rotor assembly 200a. A fastening method of the root portion 203 includes a tangential type fastening method and an axial type fastening method. This may be selected according to a required structure of a commercially-used gas turbine, and the root portion 203 may have a generally-known dovetail or fir tree shape. If necessary, each compressor blade 202 may be fastened to each compressor rotor disc 201 using another fastening device other than the shape, for example, a fixture such as a key or bolt.

The compressor section 200 includes a slot 201a, which is formed therein and through which a sealing portion 250 that will be described later can be inserted into the facing surfaces of the compressor rotor discs 201 to be coupled to one another.

The combustor 320 may be disposed at a rear end of the compressor section 200 so as to mix air compressed by the compressor section 200 with fuel to generate high-temperature high-pressure combustion gas, as described above, and a plurality of combustors 320 may be arranged in a circumference of a central axis of the rotor assembly 200a at regular intervals. The combustor 320 may include a burner including a fuel injection nozzle, etc., a combustor liner that forms a combustion chamber, and a transition piece that is a portion of connecting the combustor 320 to the gas turbine.

In detail, the liner provides a combustion space in which the fuel injected by a fuel nozzle is mixed with the compressed air of the compressor and is combusted. The liner may include a flame tube that provides a combustion space in which the fuel mixed with air is combusted, and a flow sleeve that forms a serpentine space while surrounding the flame tube. Also, the fuel nozzle is coupled to a front end of the liner, and an ignition plug is coupled to sidewalls of the liner.

The transition piece is connected to a rear end of the liner so as to transfer the combustion gas combusted by the ignition plug to the gas turbine. An outer wall portion of the transition piece is cooled by compressed air supplied from the compressor so that damage can be inhibited from occurring due to a high temperature of the combustion gas.

To this end, cooling holes through which air can be injected in an inward direction of the transition piece, are provided in the flow sleeve, and compressed air cools a main body inside the transition piece through the holes and then flows toward the liner.

Cooled air used to cool the above-described transition piece flows in the serpentine space of the liner, and compressed air may be provided as the cooled air from the outside of the flow sleeve through the cooling holes provided in the flow sleeve and may collide with outer walls of the liner.

The high-temperature high-pressure combustion gas exhausted from the combustor 320 is supplied to the turbine section 210 that will be described later. The supplied high-temperature high-pressure combustion gas expands and collides with rotation wings of the gas turbine, and a reaction force is generated to cause rotational torque, and the rotational torque is transferred to the compressor section 200 via the torque tube 240, and power that exceeds power required to drive the compressor is used to drive a power generator, etc.

The turbine section 210 is a rotating portion while the high-temperature and high-pressure combustion gas generated by the combustor 320 passes through the turbine section 210. The turbine section 210 includes a plurality of turbine rotor discs 211 that are coupled to one another, and facing surfaces of the plurality of turbine rotor discs 211 have a Curvic or Hirth structure in which they are coupled to one another by using corresponding tooth forms. A plurality of turbine blades 212 are radially installed on an outer circumferential surface of each of the plurality of turbine rotor discs 211, and the turbine rotor discs 211 are inserted into an outside of the tie rod 220 that will be described later. The turbine blade 212 may also be coupled to each of the turbine rotor discs 211 using a dovetail, etc. Furthermore, a vane (not shown) is provided between the turbine blades 212 of the turbine rotor discs 211 and is fixed to the housing 300 so that a flow direction of combustion gas that passes through the turbine blades 212 is guided.

The turbine section 210 includes a slot 211a through which a sealing portion 250 that will be described later can be inserted in the facing surfaces of the turbine rotor discs 211 to be coupled to one another.

The tie rod 220 is a shaft portion that passes through each compressor rotor disc 201 of the compressor section 200 and each turbine rotor disc 211 of the turbine section 210 and extends along a central axis of the compressor section 200 and the turbine section 210.

The fastening portion 230 fastens the compressor section 200 and the turbine section 210 to the tie rod 220 by applying an axial compressive force to the compressor section 200 and the turbine section 210 connected to each other via the tie rod 220. The fastening portion 230 is coupled to both longitudinal ends of the tie rod 220. That is, the fastening portion 230 includes a compressor rotor fastening member 231 that is coupled to one longitudinal end of the tie rod 220 and pressurizes the compressor section 200, and a turbine rotor fastening member 232 that is coupled to the other longitudinal end of the tie rod 220 and pressurizes the turbine section 210.

The torque tube 240 enables the compressor section 200 and the turbine section 210 to be uniformly rotated. The torque tube 240 is disposed between the compressor section 200 and the turbine section 210 so as to forcibly connect the compressor section 200 and the turbine section 210, and both ends of the torque tube 240 are coupled to the compressor section 200 and the turbine section 210, respectively.

The sealing portion 250 seals a space between the facing surfaces of the plurality of compressor rotor discs 201 and a space between the facing surfaces of the plurality of turbine rotor discs 211. That is, when a Curvic or Hirth structure in which the facing surfaces of the plurality of compressor rotor discs 201 and the facing surfaces of the plurality of turbine rotor discs 211 are coupled to one another as corresponding tooth forms, the sealing portion 250 seals a leakage gap in an engaging portion of hill and valley parts of tooth forms, thereby inhibiting gas from leaking through the leakage gap. The sealing portion 250 is installed in a space between the facing surfaces of the plurality of compressor rotor discs 201 to be coupled to one another, and in a space between the facing surfaces of the plurality of turbine rotor discs 211 to be coupled to one another. In more detail, the sealing portion 250 is inserted into the slot 201a of the facing compressor rotor discs 201 and the slot 211a of the facing turbine rotor discs 211. A detailed structure of the sealing portion 250 is the same as the configuration of the above-described rotor disc sealing device 100 and thus, detailed descriptions thereof will be omitted.

In this way, in the rotor assembly 200a according to an embodiment, the sealing portion 250 is inserted into the slots 201a and 211a of the facing surfaces of the plurality of compressor rotor discs 201 and the facing surfaces of the plurality of turbine rotor discs 211 so that the sealing portion 250 seals the leakage gap generated in a combined portion of the plurality of compressor rotor discs 201 and a combined portion of the plurality of turbine rotor discs 211, thereby inhibiting gas from leaking through the leakage gap. Thus, gas compression and rotation efficiency using the compressor section 200 and the turbine section 210 can be improved.

As described above, in a rotor disc sealing device, and a rotor assembly and a gas turbine including the same, a sealing portion is inserted into slots of facing surfaces of a plurality of compressor rotor discs and facing surfaces of a plurality of turbine rotor discs so that the sealing portion seals a leakage gap generated in a combined portion of the plurality of compressor rotor discs and a combined portion of the plurality of turbine rotor discs, thereby inhibiting gas from leaking through the leakage gap and improving gas compression and rotation efficiency using the compressor section and the turbine section.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A sealing device for a rotor assembly including a pair of rotor discs disposed adjacent to each other in the rotor assembly, the sealing device comprising:
    a plurality of unit plate members forming an annular seal for sealing a leakage gap occurring between facing surfaces of the pair of rotor discs, the annular seal having axially opposite sides respectively configured to be inserted into a slot formed in each of the pair of rotor discs by axially recessing the facing surface, each of the plurality of unit plate members comprising:
        circumferentially opposite ends respectively connected to one end of another unit plate member of the plurality of unit plate members;
        a sealing plate formed of a first material; and
        an auxiliary plate attached to one side of the sealing plate and formed of a second material softer than the first material.

2. The sealing device of claim 1, wherein the annular seal is circumferentially separable at any one of a plurality of lap joints connecting circumferentially adjacent pairs of the plurality of unit plate members.

3. The sealing device of claim 2, wherein the plurality of lap joints are spaced apart from each other at regular intervals around the annular seal.

4. The sealing device of claim 2, wherein the sealing plate includes circumferentially opposite ends respectively occurring at one of the plurality of lap joints, and the auxiliary plate includes circumferentially opposite ends respectively occurring at the one of the plurality of lap joints.

5. The sealing device of claim 1, wherein the circumferentially opposite ends of each of the plurality of unit plate members includes:
    a first end formed by one circumferential end of the sealing plate and one circumferential end of the auxiliary plate; and
    a second end formed by the other circumferential end of the sealing plate and the other circumferential end of the auxiliary plate.

6. The sealing device of claim 1, wherein each of the circumferentially opposite ends of each of the plurality of unit plate members includes a stepped portion forming a lap joint between circumferentially adjacent pairs of the plurality of unit plate members.

7. The sealing device of claim 6, wherein the stepped portion is formed in each of circumferentially opposite ends of the sealing plate.

8. The sealing device of claim 6, wherein the stepped portion includes first and second radial surfaces communicating with each other by circumferential surface, the first radial surface communicating with an outer circumferential surface of the sealing plate and the second radial surface communicating with an inner circumferential surface of the auxiliary plate.

9. The sealing device of claim 1, wherein the auxiliary plate has a circumferential length equal to an inner circumferential length of the sealing plate.

10. The sealing device of claim 1, wherein the sealing plate includes a hard metal or synthetic resin and the auxiliary plate includes a soft synthetic resin or rubber.

11. The sealing device of claim 1, wherein the one side of the sealing plate includes an inner circumferential surface of the sealing plate.

12. The sealing device of claim 1, wherein the sealing plate includes a round portion convexly formed opposite to the one side.

13. A rotor assembly comprising:
    a compressor section comprising a plurality of compressor rotor discs including a pair of compressor rotor discs disposed adjacent to each other in the rotor assembly;
    a turbine section comprising a plurality of turbine rotor discs including a pair of turbine rotor discs disposed adjacent to each other in the rotor assembly;
    a tie rod that passes through the compressor section and the turbine section;
    a fastening portion coupled to both ends of the tie rod and configured to fasten the compressor section and the turbine section to the tie rod;

a torque tube disposed between the compressor section and the turbine section so as to forcibly connect the compressor section and the turbine section; and a sealing device comprising a plurality of unit plate members forming an annular seal for sealing a leakage gap occurring between facing surfaces of at least one pair of rotor discs among the pair of compressor rotor discs and the pair of turbine rotor discs, the annular seal having axially opposite sides respectively configured to be inserted into a slot formed in each of the at least one pair of rotor discs by axially recessing the facing surface, each of the plurality of unit plate members comprising:

circumferentially opposite ends respectively connected to one end of another unit plate member of the plurality of unit plate members;

a sealing plate formed of a first material; and an auxiliary plate attached to one side of the sealing plate and formed of a second material softer than the first material.

14. The rotor assembly of claim 13, wherein the annular seal is circumferentially separable at any one of a plurality of lap joints connecting circumferentially adjacent pairs of the plurality of unit plate members.

15. The rotor assembly of claim 14, wherein the plurality of lap joints are spaced apart from each other at regular intervals around the annular seal.

16. The rotor assembly of claim 14, wherein the sealing plate includes circumferentially opposite ends respectively occurring at one of the plurality of lap joints, and the auxiliary plate includes circumferentially opposite ends respectively occurring at the one of the plurality of lap joints.

17. The rotor assembly of claim 13, wherein the circumferentially opposite ends of each of the plurality of unit plate members includes:

a first end formed by one circumferential end of the sealing plate and one circumferential end of the auxiliary plate; and a second end formed by the other circumferential end of the sealing plate and the other circumferential end of the auxiliary plate.

18. The rotor assembly of claim 13, wherein the fastening portion comprises:

a compressor rotor fastening member coupled to one end of the tie rod; and a turbine rotor fastening member coupled to the other end of the tie rod.

19. A gas turbine comprising the rotor assembly of claim 13.

20. A rotor disc sealing device, which seals a leakage gap generated in a space between facing surfaces of rotor discs to be coupled to one another, comprising:

slots formed in the facing surfaces of the rotor discs;

a sealing plate inserted into the slots; and an auxiliary plate coupled to one side of the sealing plate, wherein a material of the auxiliary plate is softer than that of the sealing plate, wherein the slots are formed in the rotor discs to have ring shapes in a circumferential direction, and the sealing plate and the auxiliary plate have a ring structure, and the auxiliary plate is attached to and coupled to an inner circumferential surface of the sealing plate, wherein each of the sealing plate and the auxiliary plate includes a plurality of unit plate members, each unit plate member having both ends connected to respective ends of adjacent unit plate members, and wherein coupling of the facing surfaces of the rotor discs is performed by tooth forms that engage with one another, and both connecting ends of each unit plate member are placed between hill and valley parts of the tooth forms.

* * * * *